May 12, 1959

J. D. TRIMMER 2,885,889

PNEUMATIC DEVICES FOR MEASURING FORCE

Filed Jan. 31, 1955

INVENTOR
John D. Trimmer

BY Stone, Boyden & Mack,

ATTORNEYS.

May 12, 1959     J. D. TRIMMER     2,885,889
PNEUMATIC DEVICES FOR MEASURING FORCE
Filed Jan. 31, 1955     2 Sheets-Sheet 2
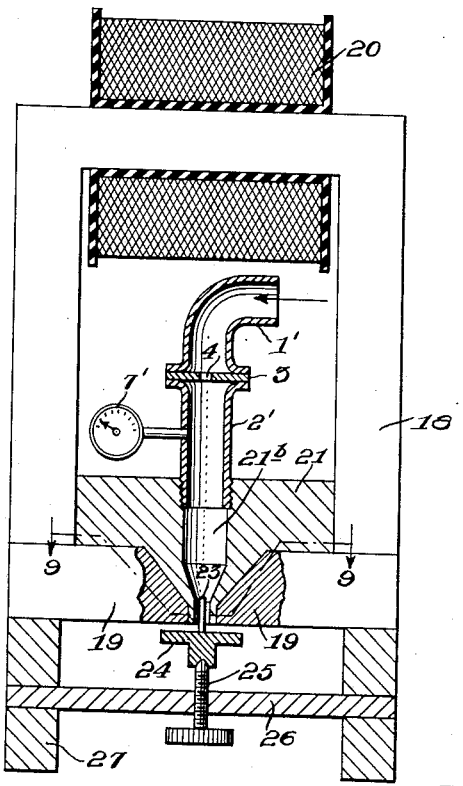
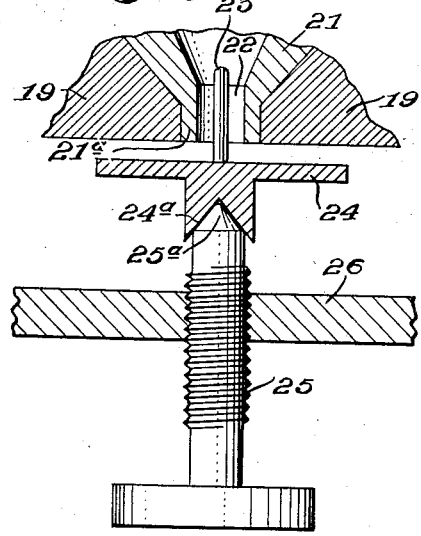
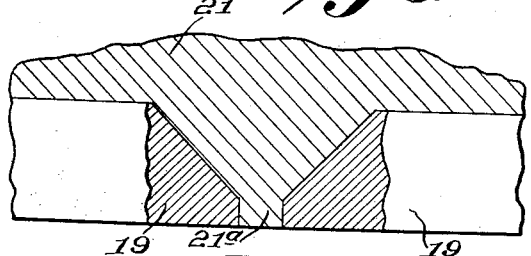
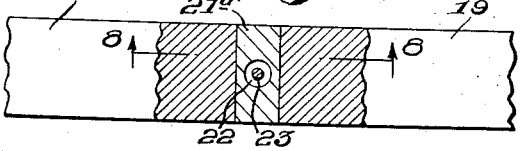
INVENTOR
John D. Trimmer
BY Stone, Boyden & Mack,
ATTORNEYS

United States Patent Office

2,885,889
Patented May 12, 1959

2,885,889

PNEUMATIC DEVICES FOR MEASURING FORCE

John D. Trimmer, Knoxville, Tenn., assignor to University of Tennessee Research Corporation, Knoxville, Tenn., a corporation of Tennessee Application January 31, 1955, Serial No. 484,915

4 Claims. (Cl. 73—141)

This invention relates to pneumatic measuring devices, and more particularly to a pneumatic device for measuring small forces.

It is well known that if an object is surrounded by a fluid, and this fluid is caused to flow along the surface of the object, the pressure on that surface is less than if the fluid were at rest. A familiar illustration of this principle is an ordinary air plane wing. Due to the camber of the wing, the upper surface is transversely longer than the lower surface and therefore the air flows faster over such upper surface. Consequently, the air pressure on the upper surface is less than on the lower surface, thus creating a suction or "lift."

The noted mathematician-scientist, Daniel Bernoulli, developed a formula for this, named for him the "Bernoulli equation." It may be written $$P = K - \tfrac{1}{2} D V^2$$

where P is the resulting pressure, D the density of the fluid, V the velocity of flow, and K a constant. This means that when the fluid flows along a surface, the pressure is reduced by the amount $\tfrac{1}{2} D V^2$.

The general object of the present invention is to devise means for utilizing this Bernoulli effect to provide a pneumatic instrument capable of measuring small forces.

The forces to be measured may be of widely different kinds. Thus, they may be due, for example, to gravity, as in the measurement of weights. Or again, as another example, they may be due to magnetism, as in the measurement of electric currents.

A subsidiary object is to provide a pneumatic device which will give relative large scale readings in response to relatively small variations in the force to be measured.

In order that the invention may be readily understood reference is had to the accompanying drawings, forming part of this specification, and in which:

Fig. 6 is a view partially in side elevation and partially in vertical section showing one form of pneumatic device for measuring the magnetic force due to an electric current;

Fig. 7 is a fragmentary sectional view on an enlarged scale showing some of the parts illustrated in Fig. 6;

Fig. 8 is a fragmentary vertical sectional view taken substantially on the line 8—8 of Fig. 9 looking in the direction of the arrows; and Fig. 9 is a fragmentary horizontal section substantially on the line 9—9 of Fig. 6, but on the same scale as Fig. 8.

Figure 1:
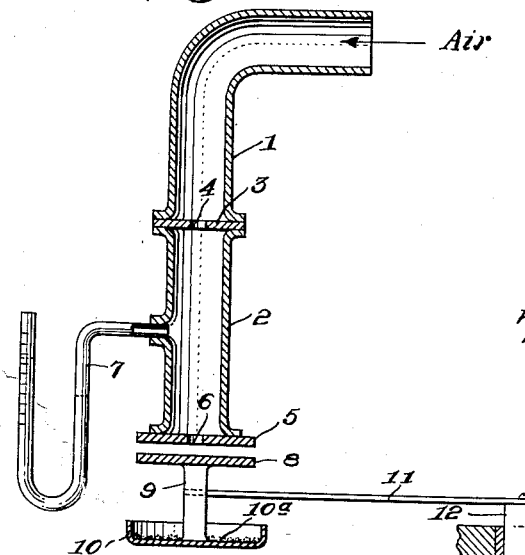
Fig. 1 is a vertical longitudinal section through one form of my improved pneumatic device for measuring small weights.

Referring to the drawings in detail and more particularly to Fig. 1, my improved apparatus there illustrated comprises a pipe 1 to which air is supplied under constant pressure. 2 is a pressure chamber which communicates at one end with the pipe 1 through a restricted opening 4, formed in a partition or diaphragm 3. At its opposite end the pressure chamber is closed by a diaphragm 5 having a restricted discharge opening 6 therein. Communicating with the pressure chamber 2 is a pressure responsive device such as a manometer 7.

From the foregoing it will be understood that air flows continuously from the pipe 1 through the restricted opening 4 into the pressure chamber 2 and is discharged therefrom through the opening 6.

The diaphragm 5 having the opening 6 therein constitutes a discharge nozzle, and it will be seen that the diaphragm or disc 5 has a flat lower surface of substantial area surrounding the aperture 6.

Extending parallel with and below the nozzle 5, 6 is a baffle 8 shown as in the form of a flat circular disc, having a central depending stem 9. Secured to the lower end of this stem is a pan 10 adapted to receive the material $10^a$ to be weighed. It is desirable that, as shown in the drawing, the baffle 8 should have an area of the same order of magnitude as the nozzle 5. The baffle and pan are supported for free vertical movement relative to the nozzle by means of a leaf spring 11 secured at one end to the stem 9 and at the other end to a block 12 vertically slidable in a fixed socket 13, and adjustable by means of a thumb screw 14 working through the bottom of such socket. By means of this thumb screw the distance between the baffle 8 and nozzle 5 may be varied as desired.

It will be obvious that if the baffle 8 is moved into direct contact with the nozzle diaphragm 5, so as to close the aperture 6, the pressure in the chamber 2 will be a maximum and will be the same as that in pipe 1. As the baffle is moved away from the nozzle the pressure in the chamber 2 decreases to a value substantially less than that in the pipe 1.

Also, when the baffle is in contact with the nozzle the repulsive force acting against the baffle is a maximum, and as the baffle is moved away, this repulsive force becomes rapidly less and less until a point is reached where, because of the Bernoulli effect, a suction is created due to the flow of air radially outward over the surface of the baffle. At a certain definite separation, depending on the physical factors existing, this suction effect will just balance the weight of the baffle and pan and the baffle will float freely in this postion. There is also, of course, a tendency for the jet of air issuing from the orifice 6 to blow the baffle away, but because of the Bernoulli effect, at a certain definite separation this tendency of the jet to blow the baffle away, as well as the weight of the baffle tending to move it away, is overcome and balanced by the suction due to the Bernoulli effect.

Figure 2:
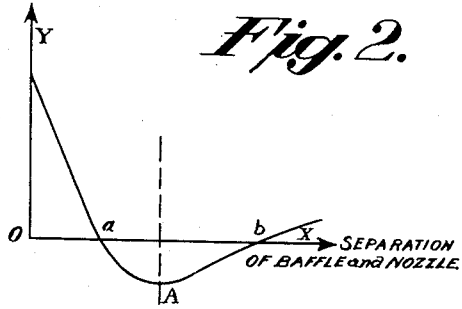
Figs. 2, 3 and 4 are diagrams illustrating the relation between the factors of force, pressure, and separation in the device shown in Fig. 1.
Figure 3:
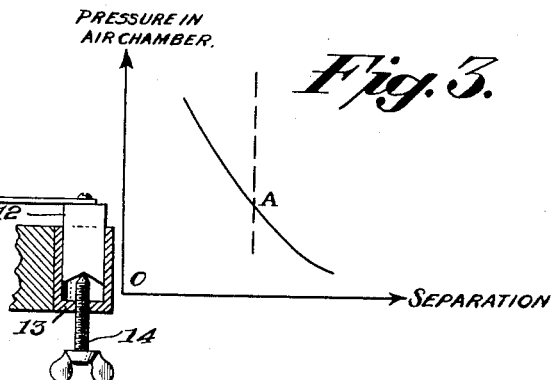

Fig. 2 shows a diagram showing the relation of the force on the baffle to the separation between baffle and nozzle. From an inspection of this figure it will be seen that the force curve beginning at zero separation is a maximum, and that as the separation increases, the force is rapidly reduced until the point $a$ is reached. The curve then crosses and extends below the X-axis, indicating the existence of a negative or suction force. This suction force increases with the separation through the critical range from point $a$ to a maximum at the point A, from which point it gradually diminishes until the separation reaches the point $b$. After that, the force becomes positive. It will be seen that at the point A the curve has zero slope which means that a substantial variation of separation may be caused by the application of very small external forces. Yet, by reference to Fig. 3, it will be seen that at the point of the curve shown in this figure corresponding with the point A in Fig. 2, the curve has a substantial slope, so that any changes in separation are reflected in substantial changes of pressure.

As an illustration, let it be assumed that the pressure in pipe 1, is 20 p.s.i., and that when the baffle is in a state of equilibrium as described, exactly half of this pressure is lost across the restricted opening 4 and the other half across the nozzle-baffle opening. Under these conditions the pressure gauge 7 would have a reading of 10. Now, suppose that some external force is applied to the baffle, as for example placing in the pan 10 a small amount of material to be weighed, as indicated at 10$^a$. This tends to move the baffle downward and to reduce the fluid resistance of the nozzle-baffle configuration. The orifice 4 remaining constant, this has the effect of reducing the pressure in the chamber 2, or, in other words, the pressure drop across the orifice 4 will now be greater than that across the nozzle. The gauge would then read (say) 9.9. This change in the reading of the pressure gauge constitutes an accurate measure of the weight of the material in the pan 10, when the pressure gauge is properly calibrated.

Figure 4:
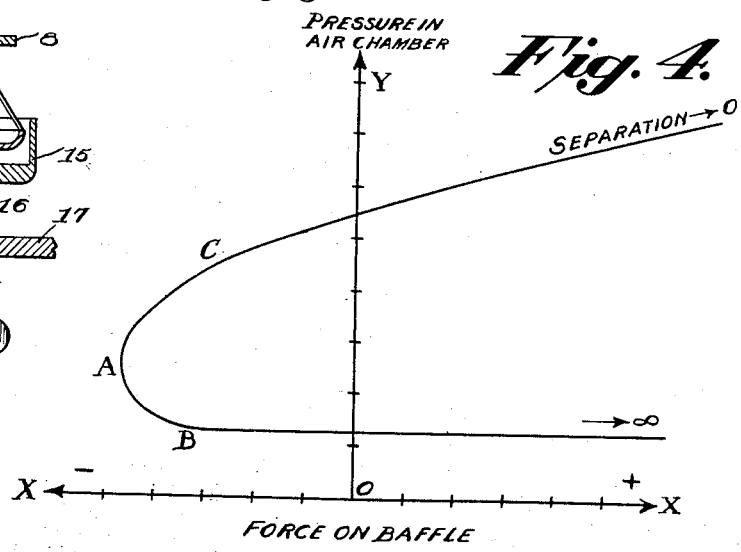

In Fig. 4, I have illustrated a curve showing the relation of pressure to force, variations in separation also being indicated. From this it will be seen that both as the separation approaches zero and also as it exceeds a certain critical value the force acting on the baffle is a positive repulsive force tending to blow it away. But, over a certain range of separation the force becomes a negative or attractive force which reaches a maximum at the point A of the curve. At this point A the slope of the curve is infinite, meaning that a very small external force would cause a substantial change in pressure. Operation of the apparatus on the branch A—B of the curve would be unstable, however, since the positive force on the baffle increases as the separation increases. Operation on the branch A—C of the curve, is, however, stable, because on this branch decreasing separation corresponds with increasing positive force. Over this range the slope of the curve is positive, of very large magnitude near the point A, and decreasing toward C.

From the foregoing considerations it is obvious that in practice and that to insure stability of the apparatus, suitable means for limiting the separation must be provided. In Fig. 1 the flat strip or leaf spring 11 supporting the baffle serves this purpose. This spring is so positioned as to be flexed extremely little by movement of the baffle through its critical range, as between the points $a$ and A of Fig. 2, and therefore does not appreciably interfere with the free movement of the baffle through such range, but as the separation increases beyond the point $b$ and the baffle is subjected to a positive repulsive force, the spring is flexed more and more until its resistance is sufficient to balance the repulsive force and thus limit the separation.

Figure 5:
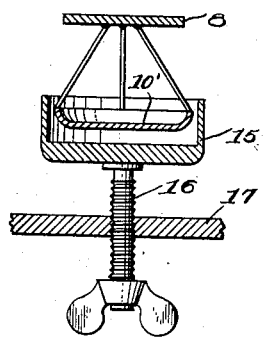
Fig. 5 is a vertical central section showing a slightly different arrangement of baffle.

In Fig. 5 I have illustrated a modified arrangement for supporting and limiting the movement of the baffle. In this figure the pan 10' carried by the baffle is inclosed in a cage 15 which is vertically adjustable by means of a thumb screw 16 working through a fixed support 17. This cage not only prevents undue lateral displacement of the baffle but also limits its downward movement, thus preventing it from being blown away, when the separation becomes so great as to destroy the Bernoulli effect. At the same time this arrangement permits the baffle to float freely within its useful range of movement.

In the foregoing description the force to be measured has been illustrated as consisting of a small weight of material. My improved apparatus, however, is capable of measuring forces other than weight, as for example, magnetic forces.

In Figs. 6 to 9, inclusive, I have illustrated pneumatic apparatus for measuring magnetic forces and, consequently, the electric currents which produce them. In these figures 18 designates a rectangular frame of magnetic material having at one end pole pieces 19 projecting toward each other in the same plane and having at the other end a coil of insulated wire 20 wound thereon. It will be obvious that current flowing in this coil sets up a magnetic flux in the frame and across the pole pieces 19 which are slightly separated as shown in Fig. 7, and the upper faces of which are bevelled downwardly so as to concentrate the flux in the tips of the pole pieces.

A block of non-magnetic material 21 is positioned above the pole pieces 19 and extends down into the separation between the pole tips as shown at 21$^a$ in Figs. 8 and 9. In the block 21 is formed a socket 21$^b$ into which is screwed a pipe 2' communicating through the restricted opening 4 with the air supply pipe 1'. The lower end of the socket 21$^b$ is reduced in diameter so as to form a restricted discharge port or aperture 22 as clearly shown in Figs. 7 and 9.

As in the preceding figures, air pressure is maintained in the pipe or chamber 2' and is indicated by a pressure gauge 7'.

Immediately below the pole pieces 19 is supported a disc-shaped baffle 24 of magnetic material having a pin 23 projecting upwardly therefrom into the port 22, in order to prevent lateral displacement of the baffle. The baffle may conveniently be supported by means of a screw 25 working through a bar 26 and having at its upper end a conical point 25$^a$ fitting in a similarly shaped pocket 24$^a$ formed in the baffle. The bar 26 may be supported by non-magnetic elements 27 secured to the magnet frame.

The same pneumatic principles apply as described above in connection with the preceding figures. That is to say, when the baffle 24 is separated from the port or aperture 22 to a given extent, it tends to remain in equilibrium due to the balancing of the various forces acting upon it. If, however, current is passed through the coil 20 thus setting up a magnetic flux between the pole pieces 19, the baffle 24 is attracted toward these pole pieces, with the result that the pressure is increased in the chamber 2', and the extent of this increase can be observed from a reading of the gauge 7'. Thus the reading of this gauge when properly calibrated, serves to measure or indicate the value of the current flowing in coil 20, since the lifting effect on the baffle varies with the amount of current in the coil.

I claim:

1. Pneumatic means for measuring forces comprising a chamber, means for supplying air to said chamber at a substantially constant rate, a discharge nozzle in communication with said chamber and having an orifice surrounded by a flat surface of substantial area, a baffle also having a flat surface of an area of the same order of magnitude, whereby, when said baffle is disposed in a horizontal plane at a point below and lying within a definite, critical range of separation from said nozzle, with the two flat surfaces parallel, a suction is created tending to move said baffle toward said nozzle against restraining forces tending to oppose such movement, means for so supporting said baffle as to permit it to assume a position within said critical range in which said suction just balances said restraining forces and the baffle floats freely, the rate of discharge of air from said nozzle orifice and the pressure existing in said chamber being a function of the extent of separation of said flat surfaces, means for applying the forces to be measured to said baffle in such a direction as to vary the extent of separation between said baffle and nozzle, said forces to be measured being of a magnitude comparable with said suction force, and means for measuring the resulting change in the pressure of air in said chamber.

2. Pneumatic means for measuring forces comprising a chamber, means for supplying air to said chamber at a substantially constant rate, a discharge nozzle in communication with said chamber and having an orifice surrounded by a flat surface of substantial area, a baffle also having a flat surface of an area of the same order of magnitude, and being biased away from said nozzle, whereby, when said baffle is disposed at a distance lying between two definite points of separation from said nozzle, with the two flat surfaces parallel, a suction is created acting against the biasing force which tends to oppose the movement of said baffle toward said nozzle, means for so supporting said baffle as to permit it to assume a position within said critical range in which said suction just balances said biasing force, the rate of discharge of air from said nozzle orifice and the pressure existing in said chamber being a function of the extent of separation of said flat surfaces, means for applying the forces to be measured to said baffle in such a direction as to vary the extent of separation between said baffle and nozzle, and means for measuring the resulting change in the pressure of air in said chamber.

3. Pneumatic means for measuring forces comprising a chamber, means for supplying air to said chamber at a substantially constant rate, a discharge nozzle in communication with said chamber and having an orifice surrounded by a flat surface of substantial area, a baffle also having a flat surface of an area of the same order of magnitude, whereby, when said baffle is disposed in a horizontal plane at a point below and separated a certain distance from said nozzle, with the two flat surfaces parallel, a suction is created acting against the force of gravity which tends to move said baffle away from said nozzle, means for so supporting said baffle as to permit it to assume a position in which said suction just balances the force of gravity and the baffle floats freely, the rate of discharge of air from said nozzle orifice and the pressure existing in said chamber being a function of the extent of separation of said flat surfaces, means for applying a weight to be measured to said baffle in such a manner as to increase the extent of separation between said baffle and nozzle, and means for measuring the resulting change in the pressure of air in said chamber.

4. Pneumatic means for measuring forces comprising a chamber, means for supplying air to said chamber at a substantially constant rate, a discharge nozzle in communication with said chamber and having an orifice surrounded by a flat surface of substantial area, a baffle also having a flat surface of an area of the same order of magnitude, whereby, when said baffle is disposed in a horizontal plane at a point below and separated a certain distance from said nozzle, with the two flat surfaces parallel, a suction is created acting against the force of gravity which tends to move said baffle away from said nozzle, means for so supporting said baffle as to permit it to assume a position in which said suction just balances the force of gravity, the rate of discharge of air from said nozzle orifice and the pressure existing in said chamber being a function of the extent of separation of said flat surfaces, means for applying a magnetic force to be measured to said baffle in such a direction as to decrease the extent of separation between said baffle and nozzle, and means for measuring the resulting change in the pressure of air in said chamber.

References Cited in the file of this patent

UNITED STATES PATENTS

| | | |
|---|---|---|
| 634,488 | Waddell et al. | Oct. 10, 1899 |
| 2,455,285 | Versaw | Nov. 30, 1948 |
| 2,478,391 | Segerstad | Aug. 9, 1949 |

FOREIGN PATENTS

| | | |
|---|---|---|
| 562,645 | Great Britain | July 11, 1944 |
| 898,931 | France | July 17, 1944 |